United States Patent
Murphy et al.

(10) Patent No.: US 10,330,456 B2
(45) Date of Patent: Jun. 25, 2019

(54) STRAIN SENSING CABLE TIE

(71) Applicant: ABB Schweiz AG, Baden (CH)

(72) Inventors: Kathryn F. Murphy, Raleigh, NC (US); Sheng Zhong, Hillsborough, NC (US); Cherif Ghoul, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/590,208

(22) Filed: May 9, 2017

(65) Prior Publication Data

US 2017/0328700 A1    Nov. 16, 2017

Related U.S. Application Data

(60) Provisional application No. 62/334,151, filed on May 10, 2016.

(51) Int. Cl.
*F16M 13/00* (2006.01)
*G01B 7/16* (2006.01)
(Continued)

(52) U.S. Cl.
CPC .............. *G01B 7/16* (2013.01); *B65D 63/10* (2013.01); *B65D 63/1027* (2013.01); *G01B 11/18* (2013.01); *G01L 1/246* (2013.01); *G01M 5/0008* (2013.01); *G01M 5/0041* (2013.01); *B65D 63/00* (2013.01); *G01D 11/30* (2013.01); *G01M 5/00* (2013.01)

(58) Field of Classification Search
CPC .......... G01B 7/16; B65D 63/10; B65D 63/00; G01M 5/0008; G01M 5/0041; G01M 5/00; G01D 11/30

USPC ........ 248/542, 548, 909, 74.3, 68.1; 33/787; 356/32
See application file for complete search history.

(56) References Cited

U.S. PATENT DOCUMENTS 4,275,599 A * 6/1981 Kohlenberger ........ G01B 11/16
                                              33/787
4,761,073 A   8/1988 Meltz et al.
(Continued)

FOREIGN PATENT DOCUMENTS

GB          2457277 A * 8/2009 ............. G01B 11/18

OTHER PUBLICATIONS

Canadian Office Action, Chinese Application No. 2966854 dated Apr. 25, 2018, 4 pgs. Apr. 24, 2018.

*Primary Examiner* — Gwendolyn W Baxter
(74) *Attorney, Agent, or Firm* — Taft Stettinius & Hollister LLP; J. Bruce Schelkopf

(57) ABSTRACT

A cable tie having a strain sensing device incorporated therein. In one embodiment, the strain sensing device is a fiber Bragg grating (FBG), which is preferably molded within the strap. In this case, the cable tie further includes a socket in optical communication with the fiber Bragg grating for coupling of the cable tie to an external light source. In another embodiment, the strain sensing device is a mechanical fuse that activates in the presence of a predetermined amount of strain on the cable tie. The mechanical fuse is preferably disposed on the strap and is made of a fuse material having a mechanical strength lower than a mechanical strength of the material of the strap so that the mechanical fuse will fracture or deform earlier than the material of the underlying strap when both the fuse and the strap experience the same increasing strain.

10 Claims, 8 Drawing Sheets

(51) Int. Cl.
*B65D 63/10* (2006.01)
*G01M 5/00* (2006.01)
*G01B 11/16* (2006.01)
*G01L 1/24* (2006.01)
G01D 11/30 (2006.01)
B65D 63/00 (2006.01)

(56) References Cited

U.S. PATENT DOCUMENTS

| | | |
|---|---|---|
| 5,000,232 A | 3/1991 | Wolcott |
| 5,237,875 A | 8/1993 | de la Veaux |
| 5,513,421 A | 5/1996 | Wells |
| 7,017,237 B2 | 3/2006 | Magno, Jr. et al. |
| 7,146,922 B1 | 12/2006 | Morton |
| 2012/0313757 A1* | 12/2012 | Volpi .................. G06K 7/0008 340/10.1 |
| 2016/0225489 A1* | 8/2016 | Willemoes ............. G01B 11/18 |

* cited by examiner

STRAIN SENSING CABLE TIE

CROSS-REFERENCE TO RELATED APPLICATIONS

This application claims priority from U.S. provisional application Ser. No. 62/334,151, filed on May 10, 2016, the specification of which is incorporated herein in its entirety for all purposes.

TECHNICAL FIELD

The present invention relates to cable ties and, more particularly, to cable ties having strain sensors or indicators incorporated therein.

BACKGROUND

Sensing devices for monitoring strain in structural applications are well known. For example, it is known to incorporate strain sensors and indicators in structures, such as bridges, pipes and aircraft, as part of a means for predicting fatigue or identifying areas which have become damaged. Such sensors, however, are typically difficult to install, prone to damage, or require electricity. These difficulties are exacerbated when they cannot be incorporated during initial construction, (e.g. when placing them on a fifty year old bridge). Additionally, strain sensors are difficult to apply around elongated structures for measuring strain radially.

Conventional prior art strain sensors for sensing or indicating strain in an underlying structure are varied. Fatigue fuses, for example, are thin pieces of metal which are designed to break at a given percent of the underlying structure's fatigue life. It is also known to use fiber Bragg gratings (FBG) embedded in a structure where strain is to be measured or embedded in fiber-reinforced plastic and applied using an adhesive or welding. Strain gauges based on changes in electrical resistance, and which can be glued to the structure to be measured, are also well known.

In a seemingly unrelated field, monitoring strain in cable tie applications is also of importance. A cable tie or tie-wrap, also known as a hose tie, zap-strap or zip tie, is a type of fastener for holding items together, such as electric cables or wires. Cable ties have been used in cable harnesses and bundling, packaging, labeling and locking.

The common tie-wrap, normally made of nylon, has a tape section with teeth that engages with a pawl in the head to form a ratchet so that, as the free end of the tape section is pulled, the tie-wrap tightens and does not come undone. Another version of the tie-wrap allows a tab to be depressed to either adjust the tension or remove the tie-wrap. Another popular design of the cable tie locking mechanism involves a metallic barb in the head slot.

A cable tie has two typical failure mechanisms. First, the cable tie strap can break when the fastening load is beyond the material strength limit. Another failure mechanism involves the unlocking of the strap from the cable tie head slot, whether the cable tie uses a plastic pawl or a metallic barb. Both failure mechanisms can cause a cable tie to fail before reaching its designated loop tensile strength rating. In many uses, the cable tie endures continuous or intermittent strain and its fatigue may pose safety threats.

Accordingly, it would be desirable to provide a means for large scale, cost efficient, widespread strain monitoring. Because of their low cost and ease of use, tie-wraps are ubiquitous, finding use in a wide range of other applications, and can, therefore, meet this need. In particular, it would be desirable to provide a strain sensing or fatigue indicating cable tie for use in both structural and cable tie applications.

A separate problem exists when installing cable ties with respect to pretension. Proper installation requires a small amount of tension, which is rarely accurately measured, leading to inconsistently applied cable ties. In large installations this may mean that some cable ties bear more load than others, resulting in premature and uneven failure.

To solve this problem, the prior art has developed cable tie tension tools, which tighten cable ties to a user-calibrated, predetermined tension limit. However, such tools are difficult and expensive to use.

It is therefore desirable to integrate some indicator of tension into the cable tie itself in order to apply the same amount of pretension to each cable tie in an installation

SUMMARY

In one aspect of the present invention, a cable tie is provided, wherein the cable tie has a strain sensing device incorporated therein.

In one embodiment, the strain sensing device is a fiber Bragg grating (FBG), which is preferably molded within the strap. In this case, the cable tie further includes a socket in optical communication with the fiber Bragg grating for coupling of the cable tie to an external light source. The socket is preferably an integrally molded extension of the head.

In another embodiment, the strain sensing device is a mechanical fuse that activates in the presence of a predetermined amount of strain on the cable tie. The mechanical fuse is preferably disposed on the strap and is made of a fuse material having a mechanical strength lower than a mechanical strength of the material of the strap so that the mechanical fuse will fracture or deform earlier than the material of the underlying strap when both the fuse and the strap experience the same increasing strain. When this happens, the mechanical fuse reveals a visible indicator.

In one embodiment, the visible indicator includes a flag member that unfolds upon fracture or deformation of the mechanical fuse. In another embodiment, the visible indicator includes a strip portion and a cover member, wherein the cover member reveals the strip portion upon fracture or deformation of the mechanical fuse. In still another embodiment, the visible indicator is an ink released from the mechanical fuse upon fracture or deformation of the mechanical fuse.

As a result of the present invention, strain sensors or indicators are incorporated into the cable tie. The strain sensing cable tie may be applied anywhere a user wants to remotely monitor strain or mechanical fatigue in a wire bundle, pipe, support, or other elongated structure where a cable tie can be installed. Strain sensing cable ties may be used either as fuses, which indicate that too much strain or vibration has occurred at some point in the past, or as easy-to-install sensors.

Features of the disclosure will become apparent from the following detailed description considered in conjunction with the accompanying drawings. It is to be understood, however, that the drawings are designed as an illustration only and not as a definition of the limits of this disclosure.

BRIEF DESCRIPTION OF THE DRAWINGS

FIG. 4b is an enlarged side view of the strain sensing cable tie shown in FIG. 4a.

DETAILED DESCRIPTION OF PREFERRED EMBODIMENTS

Figure 1:
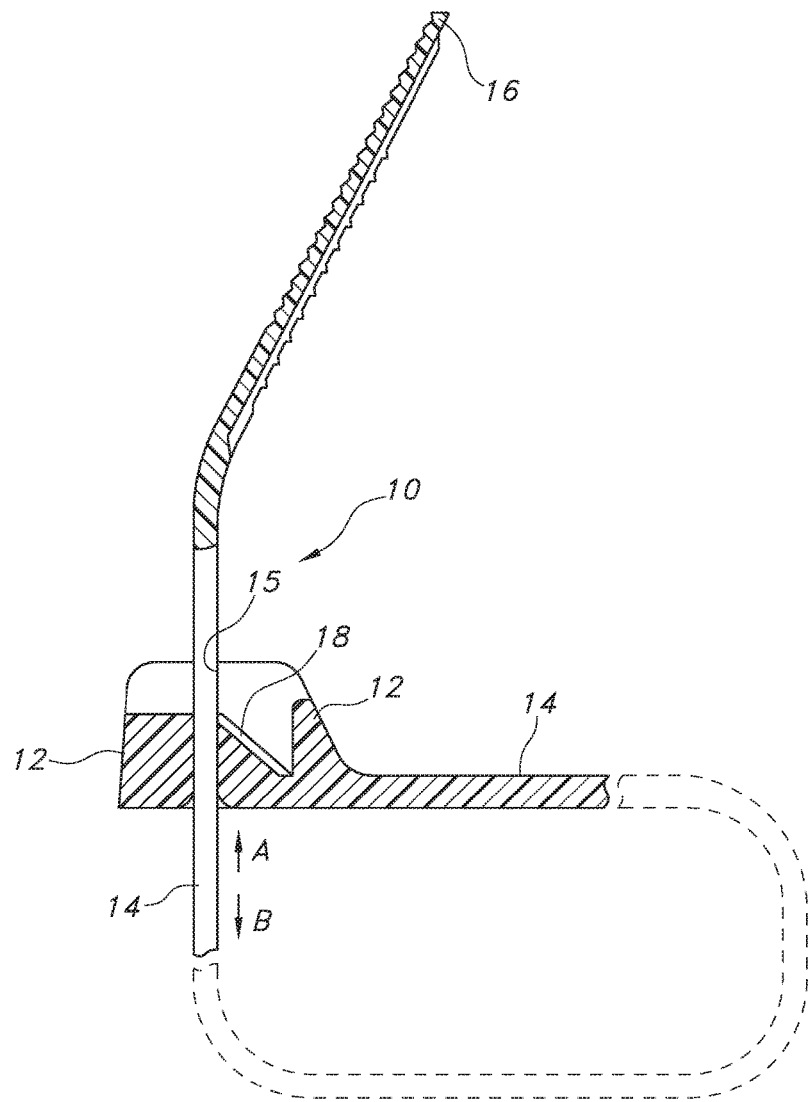
FIG. 1 shows, in section, an exemplary cable tie of the prior art, having a head containing an aperture and locking mechanism and an extending strap, with the strap inserted into the head.

Referring first to FIG. 1, a cable tie 10 of the prior art is shown for reference. The cable tie 10 of the prior art is typically an elongate molded plastic member, which is used in a manner described above to wrap around a bundle of articles (not shown). The cable tie 10 is typically made from a plastic composition and includes a head 12 at one end thereof, a tail 16 at the other end of the head and a generally planar strap 14 therebetween. In the illustrative embodiment provided, the head 12 is formed as an integral portion of the cable tie 10. However, in certain applications the cable tie 10 may be constructed in a manner where the head 12 is formed separately from the strap 16.

The head 12 of the cable tie 10 includes an aperture 15 therethrough (shown with the strap 14 therein) for insertably accommodating the tail 16 and passage of the strap 14 therein in a first direction "A". The head 12 of cable tie 10 typically includes a locking device 18 supported by the head 12 and extending into the aperture. The locking device 18 permits insertion of the strap 14 in the first direction "A" and prevents substantial movement of the strap 14 in a second direction "B" opposite the first direction upon an attempt to withdraw the strap 14 from the aperture. The locking device may include a metallic barb such as shown in U.S. Pat. No. 5,513,421, or an integrally formed plastic pawl such as shown in U.S. Pat. No. 7,017,237.

The present invention involves a cable tie similar in most respects to the prior art cable tie described above. However, according to the present invention, the cable tie has a strain sensing device incorporated therein. As will be described in further detail below, the strain sensing device can take one or more alternative forms.

In a first embodiment, continuous monitoring of strain can be accomplished using a fiber Bragg grating (FBG) embedded within the cable tie. A fiber Bragg grating (FBG) is a type of distributed Bragg reflector constructed in a short segment of optical fiber that reflects particular wavelengths of light and transmits all others. This is achieved by creating a periodic variation in the refractive index of the fiber core, which generates a wavelength-specific dielectric mirror. A fiber Bragg grating can therefore be used as an inline optical filter to block certain wavelengths, or as a wavelength-specific reflector.

Bragg gratings reflect light with wavelength $\lambda_{Bragg}$ depending on the spacing of the refractive index variations ("lines") in the grating. $\lambda_{Bragg}$ is determined by the equation: $\lambda_{Bragg}=2n\Lambda$, where n is the effective refractive index of the medium (in this case the fiber core) and $\Lambda$ is the period of the grating (i.e., the spacing of lines in the grating). So the wavelength of reflected light ($\lambda_{Bragg}$) depends on $\Lambda$.

It can be appreciated that a change in the spacing of lines in the grating will change the wavelength of the light reflected by the grating. As a result, an FBG can be very useful as a strain sensing device. This is further illustrated in FIGS. 2a and 2b.

Figure 2A:
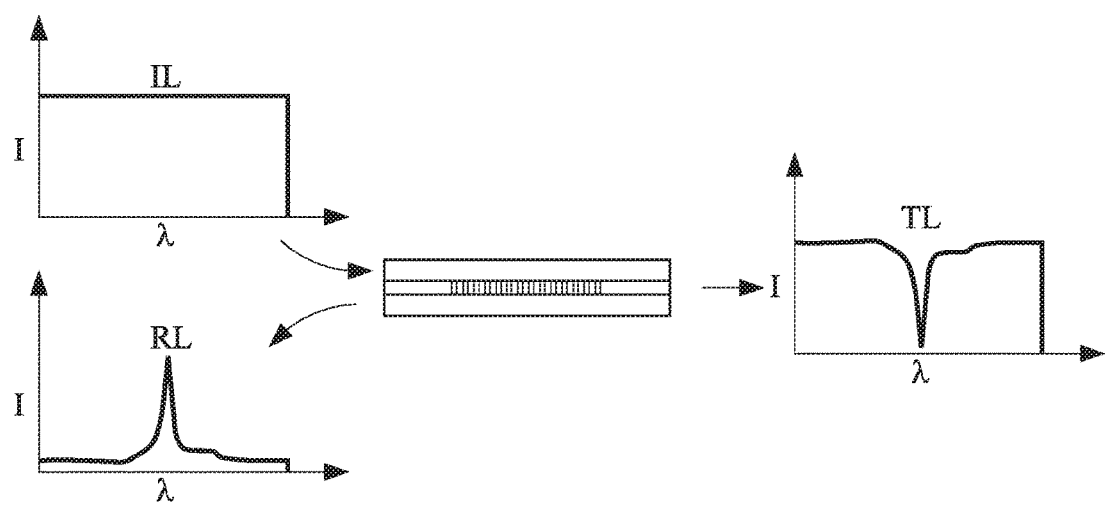
FIGS. 2a and 2b are graphical representations illustrating the concept of a fiber Bragg grating (FBG).
Figure 2B:
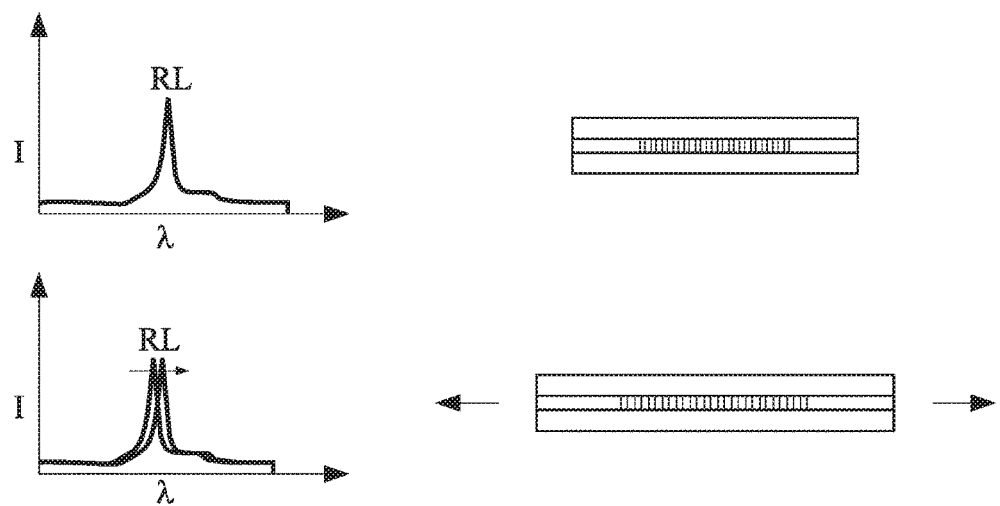

FIG. 2a illustrates the fiber Bragg grating (FBG) concept. When white light is incident on the grating (IL), most light is transmitted (TL) but some light at a specific wavelength is reflected (RL). The wavelength ($\lambda$) of reflected light depends on the spacing of lines in the grating. When the spacing between the lines is increased, such as by an applied strain, the wavelength of the reflected light changes. Thus, as shown in FIG. 2b, the wavelength of the reflected light depends on strain.

As a result, FBGs can be used as strain sensors. Typically, these fibers are embedded directly inside a structure to be monitored or affixed externally using an adhesive. According to the present invention, however, an FBG is embedded within a cable tie.

Figure 3:
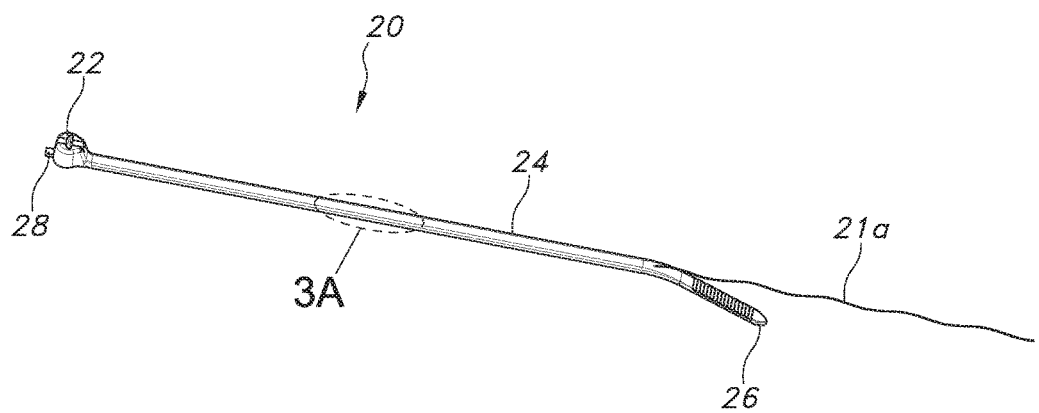
FIG. 3 is a perspective view of a strain sensing cable tie formed in accordance with a first embodiment of the present invention.
Figure 3A:
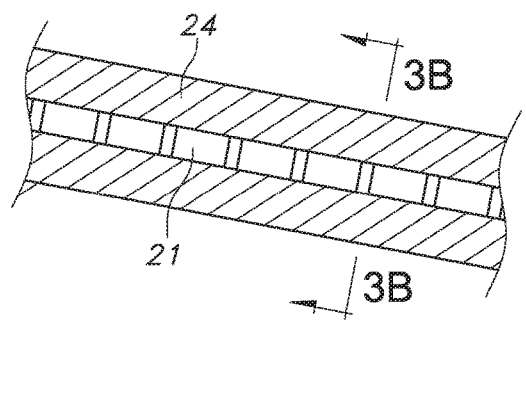
FIG. 3a is an enlarged detail view of a cross-section of a section of the cable tie shown in FIG. 3.
Figure 3B:
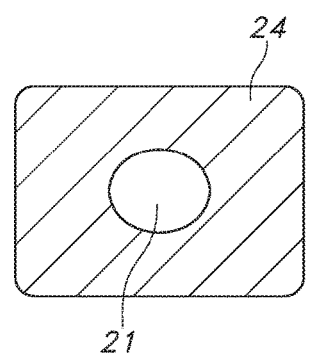
FIG. 3b is a cross-sectional view of the section of the cable tie shown in FIG. 3a, taken along the line 3b-3b.
Figure 4A:
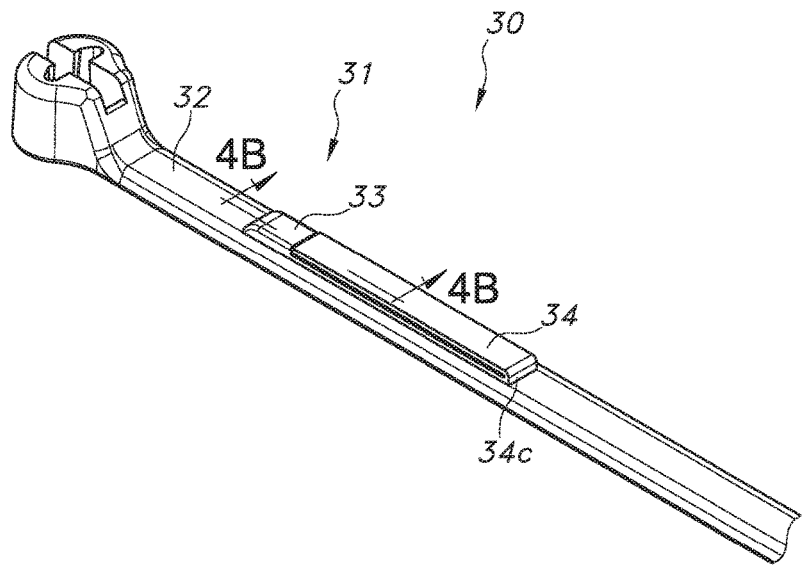
FIG. 4a is a perspective view of a first variant of a strain sensing cable tie formed in accordance with a second embodiment of the present invention.
Figure 4B:
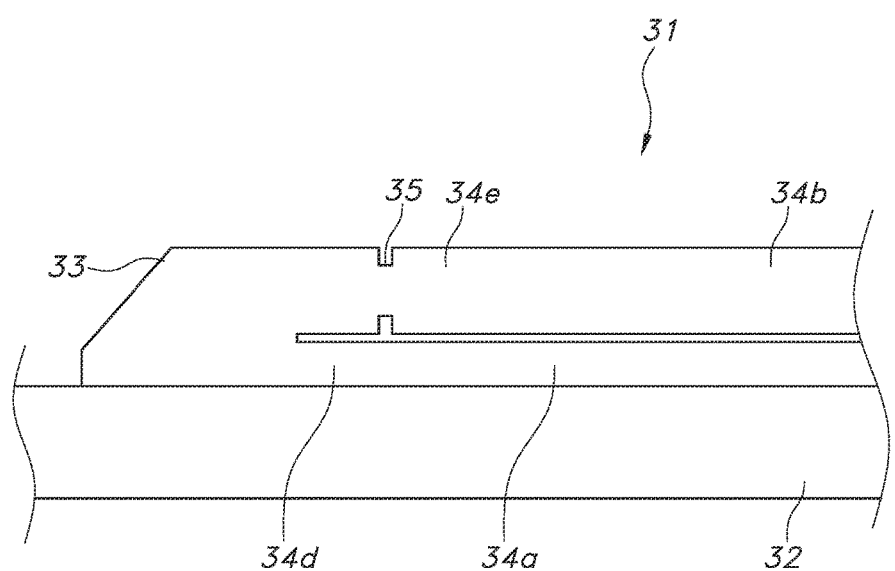
Figure 4C:
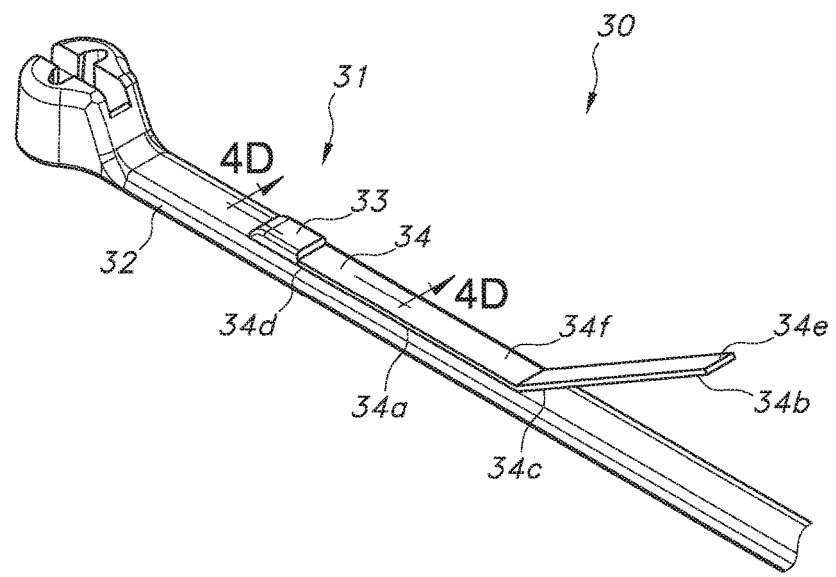
FIG. 4c shows the cable tie shown in FIGS. 4a and 4b after the mechanical fuse has failed.
Figure 4D:
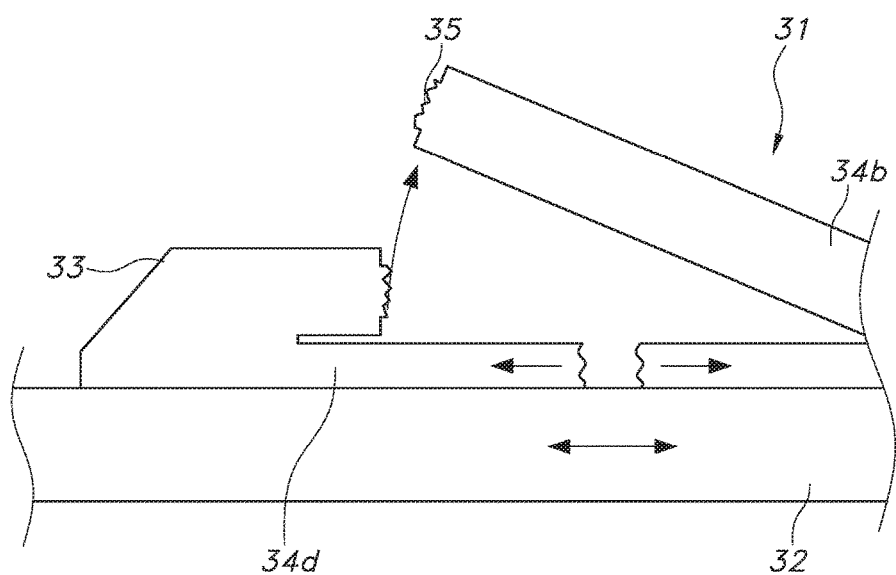
FIG. 4d is an enlarged side view of the strain sensing cable tie shown in FIG. 4c.

Turning to FIG. 3, a cable tie 20 having a fiber Bragg grating (FBG) 21 embedded therein is shown. The cable tie 20 of the present invention is similar in several respects to the prior art cable tie 10 described above. Accordingly, the cable tie 20 includes a head 22 at one end thereof, a tail 26 at the other end of the head and a generally planar strap 24 therebetween. The head 22 of the cable tie 20 includes an aperture having a locking device that permits insertion of the strap 24 in one direction, but prevents removal of the strap in the opposite direction.

However, the cable tie 20 of the present invention is molded with a fiber Bragg grating (FBG) 21 disposed preferably within and extending collinearly along at least a length of the strap 24. In a preferred embodiment, the fiber Bragg grating (FBG) 21 is disposed on the centerline of the strap 24, and extends along the entire length of the strap. In this embodiment, the FBG 21 extends through the head 22 and terminates at a socket 28.

The socket 28 is preferably an integrally molded extension of the head 28 and is designed for connection with an optical line from a light source and/or a light detector (not shown). The socket 28 may take the form of a conventional fiber optic coupling or fiber optic connector that holds two ends of optical fiber together. The light source/detector may be detachable or attached permanently to the socket 28 for continuous monitoring. Light emitted from the light source is thus communicated through the socket 28 into the FBG 21. Reflected light from the grating of the FBG 21 likewise travels back through the socket 28 to a light detector.

In an alternative embodiment, a tail portion 21a of the FBG 21 can be exposed so that it extends out or exits from the tail 26 of the tie for connection to a light source and/or a detector.

The FBG 21 may be incorporated into the cable tie 20 by injection molding, compression molding, or casting over a fiber held in a mold. The FBG 21 may also be incorporated into the cable tie 20 by co-extruding the fiber and plastic and attaching a separate head. Still other methods of manufacturing the cable tie 20 are by lamination or by some combination of these methods.

For the cable tie, different thermoplastic materials could be used, (e.g., PA, POM, PBT, ETFE, PP, etc.). Thus, suitable base plastics include, but are not limited to, polyamide (e.g., nylon), polypropylene, polycarbonate, poly (ethylene tetrafluoroethylene), polyetheretherketone, poly (ethylene and chlorotrifluoroethylene), polyvinyl chloride, polyimide, polysulfone, and combinations of two or more thereof. Suitable base plastic materials may also include thermosets. In one embodiment, the base plastic is polypropylene. In one embodiment, the base plastic is polyamide. In one embodiment, the base plastic is polyamide 6 (i.e., nylon 6). In one embodiment, the base plastic is polyamide 6,6 (i.e., nylon 6,6). In one embodiment, base plastic is polyamide 6,6 loaded at between about 90-100 phr. In one embodiment, polyamide 6,6 is loaded at about 100 phr. In one embodiment, polyamide 6,6 loaded at about 100 phr is a medium impact modified compound with embedded process aid. In one embodiment, polyamide 6,6 loaded at about 100 phr is an unfilled resin with embedded process aid.

Any conventional FBG 21 capable of being molded within a thermoplastic material can be used with the present invention.

As a result of this first embodiment of the present invention, a cable tie 20 is provided that allows for modular, after market installation and better protection of the FBG 21 from damage. The embedded FBG sensor 21 provides the ability to continuously monitor strain or to indicate that at some point in its history whether the cable tie has been excessively strained.

The advantages of this first embodiment (embedded fiber) of the present invention include: Simple installation (anyone can install it with no extra tools or adhesives); Mechanically robust strain sensing (sensor is well-protected from damage); Advantages of FBG strain sensors over resistive strain sensors (don't interfere with electromagnetic signals since no metal or electricity is used); Monitoring can be done at very long distances (kilometers) without signal amplification; and Sensor is glass so it has good corrosion resistance and does not creep.

Figure 5A:
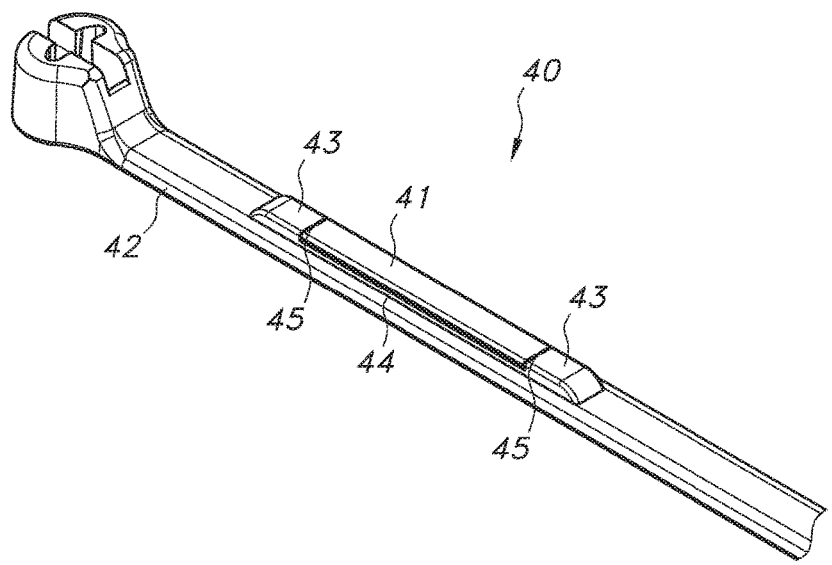
FIG. 5a is a perspective view of a second variant of a strain sensing cable tie formed in accordance with the second embodiment of the present invention.
Figure 5B:
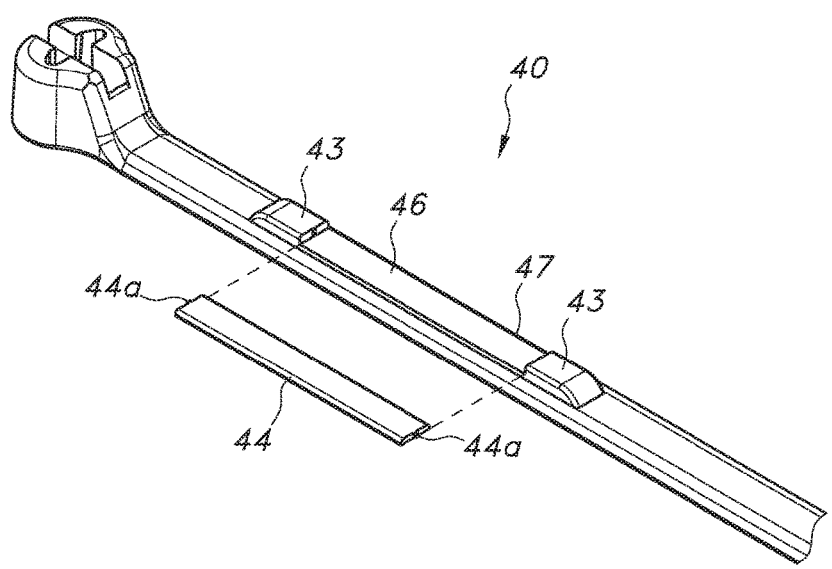
FIG. 5b shows the cable tie shown in FIG. 5a after the mechanical fuse has failed.
Figure 6A:
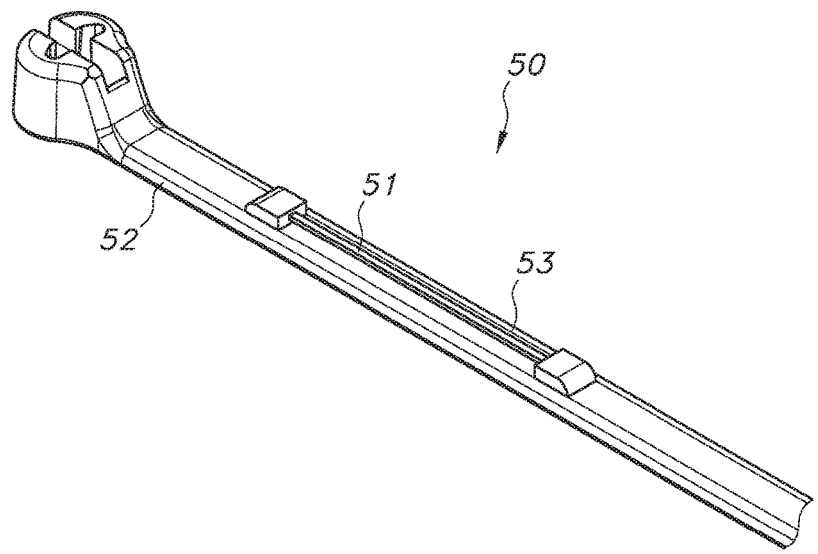
FIG. 6a is a perspective view of a third variant of a strain sensing cable tie formed in accordance with the second embodiment of the present invention.
Figure 6B:
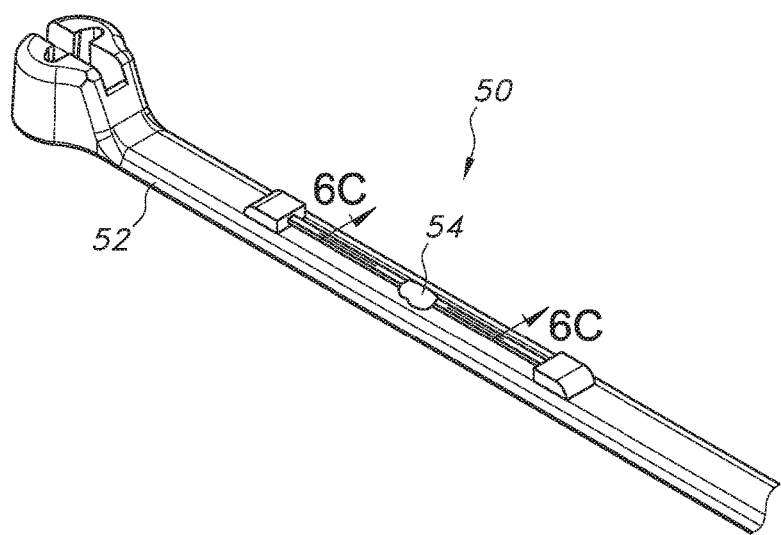
FIG. 6b shows the cable tie shown in FIG. 6a after the mechanical fuse has failed.
Figure 6C:
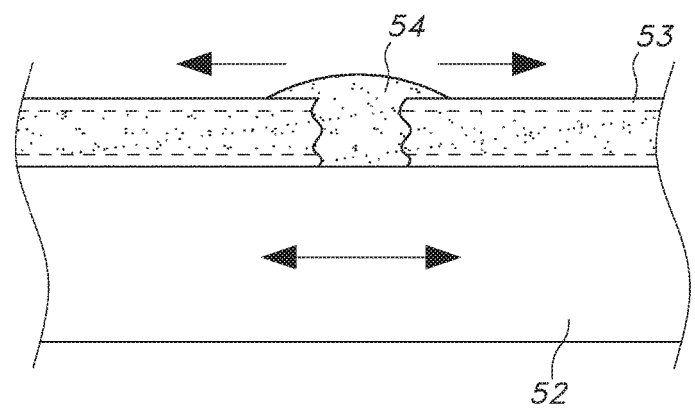
FIG. 6c is an enlarged side view of the strain sensing cable tie shown in FIG. 6b.

Turning now to FIGS. 4-6, in a second embodiment of the present invention, a cable tie 30, 40, 50 is provided with a mechanical fuse that indicates the presence of excessive strain or vibration by revealing a highly visible flag or ink. In this second embodiment, when the cable tie 30, 40, 50 has experienced strain or vibration over one or more thresholds, a mechanical fuse will fail, creating a visual signal.

In each of the three variants of the second embodiment of the present invention, respectively shown in FIGS. 4-6, a mechanical fuse is made from a weak, brittle material, as compared to the material of the cable tie itself. In this manner, the mechanical fuse will fracture or deform earlier than the material of the underlying cable tie. When this happens, the fuse "fails" and a highly visible indicator is revealed. This is analogous to an electrical fuse which is designed to fail at a current level less than that which would cause damage to the protected electrical components.

In a first variant, as shown in FIGS. 4a, 4b, 4c and 4d, a mechanical fuse 31 is fixed to the strap portion 32 of the cable tie 30. As mentioned above, the fuse 31 is made from a weak or brittle material and is fixed to the strap portion 32, such as by an adhesive, welding or over molding.

The fuse 31 includes a latch portion 33 and a resilient flag member 34 connected to the latch portion via a frangible portion 35. The latch portion 33 retains a free end 34e of the resilient flag member 34 in a closed position when the fuse 31 is in its initial "untripped" state. The flag member 34 has a first arm 34a connected at one end 34d to the latch portion 33 and pivotably connected at its opposite end to a second arm 34b about a hinge 34c. The hinge 34c may simply be the intersecting line formed when the first arm 34a and the second arm 34b are folded together. The end 34d of the first arm 34a opposite the hinge 34c is fixed to the latch portion 33 in a non-releasable manner. In contrast, the free end 34e of the second arm 34b opposite the hinge is connected to the latch portion 33 in a releasable manner via the frangible portion 35. The inner surfaces 34f of the first and second arms that face each other when folded together are reflective, bright colored or phosphorescent to form an easily detectable visual indicator.

The frangible portion 35 is preferably an area of reduced thickness integrally formed between the latch portion 33 and the free end 34e of the flag member 34. Due to the reduced thickness of the frangible portion 35, an area of weakness is provided in the fuse. Specifically, when subject to a strain, the frangible portion 35 will break or fracture before any other areas of the fuse.

In use, when the strap 32 of the cable tie stretches under strain, the fuse 31 will also begin to stretch. However, given the low strength of the material of the mechanical fuse 31, as compared to the material of the cable tie, the fuse 31 will fracture at a given threshold, before the cable tie strap fractures. Specifically, as the cable tie strap 32 begins to stretch, the first arm 34a of the fuse 31, which is fixed to the strap, will also begin to stretch. At a given threshold, the frangible portion 35 between the second arm 34b of the flag member 34 and the latch portion 33 will fracture, which will thereby release the releasable end 34e of the second arm 34b from the latch portion 33 of the fuse. Once released, the flag member 34 will unfold about its hinge 34c to reveal the visual indicator 34f provided on the inner surfaces of the first and second arms.

In a second variant, as shown in FIGS. 5a and 5b, a mechanical fuse 41, having two latch portions 43 and a cover member 44 releasably attached to the latch portions via respective frangible portions 45, is fixed to the strap portion 42 of the cable tie 40. The fuse 41 may include a central portion 46 extending between the two latch portions 43 and fixed to the strap 42 of the cable tie. Here too, the fuse 41, particularly the frangible portion 45, is made from a weak or brittle material, as compared to the material of the cable tie 40.

In its initial "untripped" state, the latch portions 43 of the fuse 41 retain the cover member 44 in a closed position. The cover member 44 can take the form of a simple flat plate having opposite ends 44a releasably retained by a reduced thickness frangible portion, as described above. The cover member 44 covers a brightly colored, reflective or phosphorescent strip surface 47 of the central portion 46. In use, when the cable tie stretches under strain, the frangible portions 45 of the mechanical fuse 41, which is fixed to the strap 42, will fracture at a given threshold, as described above. This will cause the opposite latch portions 43 to move away from one another, thereby releasing the cover member 44 from the latch portions. Once released, the visual indicator 47 provided by the strip portion will be revealed to indicate a "blown" fuse.

It is conceivable that the fuse variant shown in FIGS. 5a and 5b can involve fuse materials that do not fracture and/or that the central portion can be omitted. In this alternative, the stretching of the cable tie strap 42 itself will cause the latch portions to move away from each other to release the cover member, which may be releasably retained to the latch portions by, for example, a lip or other type of retaining hook. In either case, it will be important to design the length of the cover member and the length of the lips of the latch portions in a way that will ensure a release of the cover member at a given length of stretching of the cable tie strap, but before the strap fails.

In a third variant, as shown in FIGS. 6a and 6b, a mechanical fuse 51 including a breakable tube 53 is fixed to the strap portion 52 of the cable tie 50. Here, the enclosed tube 53 of the mechanical fuse 51 forms a receptacle for containing a brightly colored, reflective or phosphorescent ink 54. The tube 53 is made from a weak or brittle material and is fixed to the strap portion 42, as described above. In its initial "untripped" state, the fuse 51 retains the ink contained within the tube 53 in an obscured manner. In use, when the cable tie stretches under strain, the tube 53 of the mechanical fuse 51 will fracture at a given threshold, thereby releasing the ink 54 to provide a visual indicator that the fuse has "blown."

In this variant, as an alternative to the fuse, pigment-containing microcapsules could be embedded in the cable tie itself. Above a certain strain, the microcapsules will break so that the color of the cable tie will change. Such microcapsules could also contain a material which will repair damage to the cable tie, preventing its failure.

In each of these variants, it is conceivable that multiple fuses can be provided, wherein each fuse is designed to fail at a different strain. In this case, different visual indicators can be provided to indicate the degree of strain experienced by the cable tie. For instance, a green indicator can be provided to indicate 1% strain and a red indicator can indicate 10% strain.

The advantages of this second embodiment (mechanical fuse) of the present invention include: Easy means of predicting failure; Highly visible features make inspection quick and easy, (especially in areas which are hard to access); Simplest means of consistently installing cable ties (i.e., each fuse will break at the same tension); Ability to incorporate multiple levels of strain indicating (i.e., multiple fuses with different strengths on a single cable tie can indicate the level of damage).

It should be apparent to those skilled in the art that the described embodiments of the present invention provided herein are illustrative only and not limiting, having been presented by way of example only. As described herein, all features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. While various embodiments of the present invention are specifically illustrated and/or described herein, it will be appreciated that modifications and variations of the present invention may be effected by those skilled in the art without departing from the spirit and intended scope of the invention.

All documents, patents and other literature referred to herein are incorporated by reference in their entirety.

The term "comprising" as may be used in the following claims is an open-ended transitional term that is intended to include additional elements not specifically recited in the claims. The term "consisting essentially of" as may be used in the following claims is a partially closed transitional phrase and is intended to include the recited elements plus any unspecified elements that do not materially affect the basic and novel characteristics of the claims. For example, the cable tie may be embossed or printed with indicia and still be included in the meaning of "consisting essentially of", even if not specifically recited. The term "consisting of" as may be used in the following claims is intended to indicate that the claims are restricted to the recited elements.

It should be noted that it is envisioned that any feature, element or limitation that is positively identified in this document may also be specifically excluded as a feature, element or limitation of an embodiment of the present invention.

What is claimed is:

1. A cable tie comprising:
   an elongate strap;
   a head attached to a first end of said strap, said head having an aperture formed therein;
   a locking device disposed in said aperture of said head, said locking device being configured to permit a second end of said strap opposite said head to be inserted through said head aperture in a first direction and being further configured to prevent movement of said second end of said strap from said head aperture in a second direction opposite said first direction;
   a strain sensing device disposed in said strap, wherein said strain sensing device is a fiber Bragg grating (FBG) molded within said strap; and
   a fiber optic coupling in optical communication with said fiber Bragg grating for coupling of the cable tie to an external light source, wherein said coupling is an integrally molded extension of said head.

2. A cable tie comprising:
   an elongate strap;
   a head attached to a first end of said strap, said head having an aperture formed therein;
   a locking device disposed in said aperture of said head, said locking device being configured to permit a second end of said strap opposite said head to be inserted through said head aperture in a first direction and being further configured to prevent movement of said second end of said strap from said head aperture in a second direction opposite said first direction; and
   a strain sensing device disposed in said strap,
   wherein said strain sensing device is a mechanical fuse that activates in the presence of a predetermined amount of strain on the cable tie.

3. A cable tie as defined in claim 2, wherein said strain sensing device comprises a first mechanical fuse and a second mechanical fuse, the first mechanical fuse activating in the presence of a first predetermined amount of strain on the cable tie and the second mechanical fuse activating in the presence of a second predetermined amount of strain on the cable tie, the first predetermined amount of strain being different than the second predetermined amount of strain.

4. A cable tie as defined in claim 2, wherein said mechanical fuse is disposed on said strap and comprises a fuse material, said fuse material having a mechanical strength lower than a mechanical strength of the material of the strap, wherein the mechanical fuse will fracture or deform earlier than the material of the strap when both the fuse and the strap experience the same increasing strain.

5. A cable tie as defined in claim 4, wherein a visible indicator is revealed upon fracture or deformation of the mechanical fuse.

6. A cable tie as defined in claim 5, wherein said visible indicator comprises a flag member, said flag member unfolding upon fracture or deformation of the mechanical fuse.

7. A cable tie as defined in claim 5, wherein said visible indicator comprises a strip portion and a cover member, said cover member revealing said strip portion upon fracture or deformation of the mechanical fuse.

8. A cable tie as defined in claim 5, wherein said visible indicator is an ink released from said mechanical fuse upon fracture or deformation of the mechanical fuse.

9. A cable tie as defined in claim 5, wherein said visible indicator is reflective, phosphorescent, or brightly colored.

10. A cable tie as defined in claim 4, wherein a self-healing material is released from the mechanical fuse upon fracture or deformation of the mechanical fuse.

* * * * *